United States Patent
Hollender

(10) Patent No.: US 9,985,812 B1
(45) Date of Patent: May 29, 2018

(54) SYSTEMS AND METHODS FOR IQ DEMODULATION WITH ERROR CORRECTION

(71) Applicant: Keysight Technologies, Inc., Minneapolis, MN (US)

(72) Inventor: Reinhold Frederick Hollender, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days. days.

(21) Appl. No.: 15/387,082

(22) Filed: Dec. 21, 2016

(51) Int. Cl.
*H04L 27/233* (2006.01)
*H04B 17/21* (2015.01)

(52) U.S. Cl.
CPC ......... *H04L 27/2334* (2013.01); *H04B 17/21* (2015.01)

(58) Field of Classification Search
CPC .................................................. H04L 27/2334
USPC ......................................................... 375/340
See application file for complete search history.

(56) References Cited

U.S. PATENT DOCUMENTS

| | | | |
|---|---|---|---|
| 6,009,317 A | 12/1999 | Wynn | |
| 7,088,765 B1 * | 8/2006 | Green | .................... H04L 27/364 375/142 |
| 8,638,893 B2 | 1/2014 | Dark | |
| 9,197,263 B2 | 11/2015 | Onishi | |
| 2007/0099570 A1 * | 5/2007 | Gao | .......................... H04B 1/30 455/63.1 |
| 2013/0223571 A1 * | 8/2013 | Dark | .................... H04B 1/0028 375/340 |

OTHER PUBLICATIONS

S. W. Ellingson, Correcting I-Q Imbalance in Direct Conversion Receivers, Feb. 10, 2003.

* cited by examiner

*Primary Examiner* — Michael Neff

(57) ABSTRACT

Generally, in accordance with the various illustrative embodiments disclosed herein, an RF receiver can include an error correction system that executes a signal processing procedure upon a multi-tone digital I-signal and a multi-tone digital Q-signal to derive a wideband correction matrix. The wideband correction matrix can be used to correct one or more of: an amplitude error in any one or more frequency components of an RF input signal provided to the RF receiver, a phase error in any one or more frequency components of the RF input signal, a gain mismatch error between an analog I-signal circuit portion of the RF receiver and an analog Q-signal circuit portion of the RF receiver, or a phase mismatch error between the analog I-signal circuit portion of the RF receiver and the analog Q-signal circuit portion of the RF receiver.

20 Claims, 11 Drawing Sheets

SYSTEMS AND METHODS FOR IQ DEMODULATION WITH ERROR CORRECTION

BACKGROUND

Many modern radio receivers are designed to operate in the digital domain when performing a final frequency conversion step (also known as I-Q demodulation) wherein a signal at a radio frequency (RF) or intermediate frequency (IF) is converted into a complex baseband signal. Performing this frequency conversion step in the digital domain has a number of benefits in that the digital signal paths between the real (I) and imaginary (Q) parts of the signal are exactly matched and their phase relationship does not deviate from an ideal quadrature relationship.

In contrast to this approach, some other types of radio receivers perform the frequency conversion step in the analog domain. Operating in the analog domain can lead to the I-channel signal path and Q-channel signal path having different characteristics and the phase relationship between the real and imaginary parts of the signal deviating from the ideal quadrature relationship. Both of these effects can lead to errors being present in the demodulated signal and these errors can sometimes be difficult to correct or may even be uncorrectable. Nevertheless, a radio receiver performing I-Q demodulation in the analog domain can provide certain benefits such as a wider bandwidth and fewer processing steps in a digital domain signal processing portion of the radio receiver. In view of such benefits, particularly in terms of the wider bandwidth, it is desirable to provide for improved error detection and error correction circuitry in these types of radio receivers.

SUMMARY

Certain embodiments of the disclosure can provide a technical effect and/or solution to derive a wideband impairment matrix in an RF receiver that incorporates I-Q signal processing circuitry. The wideband impairment matrix can be incorporated into a wideband error correction filter that is used to correct amplitude errors and/or phase errors in frequency components of an RF input signal provided to the RF receiver. The wideband error correction filter can be further used to correct gain mismatch and/or phase mismatch errors between an analog I-signal circuit portion of the RF receiver and an analog Q-signal circuit portion of the RF receiver.

According to one exemplary embodiment of the disclosure, an apparatus incorporates a radio-frequency (RF) receiver, the RF receiver including an I-Q demodulator, one or more analog-to-digital converters, and an error correction system. The I-Q demodulator is configured to receive a multi-tone calibration signal and convert the multi-tone calibration signal into a multi-tone analog I-signal and a multi-tone analog Q-signal. At least one analog-to-digital converter is configured to convert the multi-tone analog I-signal and the multi-tone analog Q-signal to a multi-tone digital I-signal and a multi-tone digital Q-signal respectively. The error correction system, which includes a processor, is configured to execute a signal processing procedure upon the multi-tone digital I-signal and the multi-tone digital Q-signal to derive a wideband impairment matrix, and to generate from the wideband impairment matrix, a wideband error correction filter operative to correct at least one error in an RF input signal provided to the RF receiver.

In an exemplary implementation, the error(s) can be an amplitude error in any one or more frequency components of an RF input signal provided to the RF receiver, a phase error in any one or more frequency components of the RF input signal, a gain mismatch error between an analog I-signal circuit portion of the RF receiver and an analog Q-signal circuit portion of the RF receiver, and/or a phase mismatch error between the analog I-signal circuit portion of the RF receiver and the analog Q-signal circuit portion of the RF receiver.

According to another exemplary embodiment of the disclosure, a method includes receiving a multi-tone calibration signal in a radio-frequency (RF) receiver, using an I-Q demodulator of the RF receiver to convert the multi-tone calibration signal into a multi-tone analog I-signal and a multi-tone analog Q-signal, using at least one analog-to-digital converter of the RF receiver to convert the multi-tone analog I-signal and the multi-tone analog Q-signal to a multi-tone digital I-signal and a multi-tone digital Q-signal respectively, deriving a wideband impairment matrix by executing a signal processing procedure upon the multi-tone digital I-signal and the multi-tone digital Q-signal, generating from the wideband impairment matrix, a wideband error correction filter, receiving in the RF receiver, an RF input signal, and using the wideband error correction filter to correct at least one error in the RF input signal.

In an exemplary implementation, the error(s) can be an amplitude error in any one or more frequency components of the RF input signal, a phase error in any one or more frequency components of the RF input signal, a gain mismatch error between an analog I-signal circuit portion of the RF receiver and an analog Q-signal circuit portion of the RF receiver, and/or a phase mismatch error between the analog I-signal circuit portion of the RF receiver and the analog Q-signal circuit portion of the RF receiver.

According to yet another exemplary embodiment of the disclosure, an error correction system includes a processor configured to derive a wideband impairment matrix by executing a signal processing procedure upon a multi-tone digital I-signal and a multi-tone digital Q-signal provided to the error correction system by a radio-frequency (RF) receiver, generate from the wideband impairment matrix, a wideband error correction filter, and use the wideband error correction filter to correct at least one error in an RF input signal provided to the RF receiver.

In an exemplary implementation, the errors(s) can be an amplitude error in any one or more frequency components of an RF input signal provided to the RF receiver, a phase error in any one or more frequency components of the RF input signal, a gain mismatch error between an analog I-signal circuit portion of the RF receiver and an analog Q-signal circuit portion of the RF receiver, and/or a phase mismatch error between the analog I-signal circuit portion of the RF receiver and the analog Q-signal circuit portion of the RF receiver.

Other embodiments and aspects of the disclosure will become apparent from the following description taken in conjunction with the following drawings.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale; emphasis instead being placed upon illustrating the principles of the invention. The drawings should not be interpreted as limiting the scope of the invention to the example embodiments shown herein.

DETAILED DESCRIPTION

Figure 1:
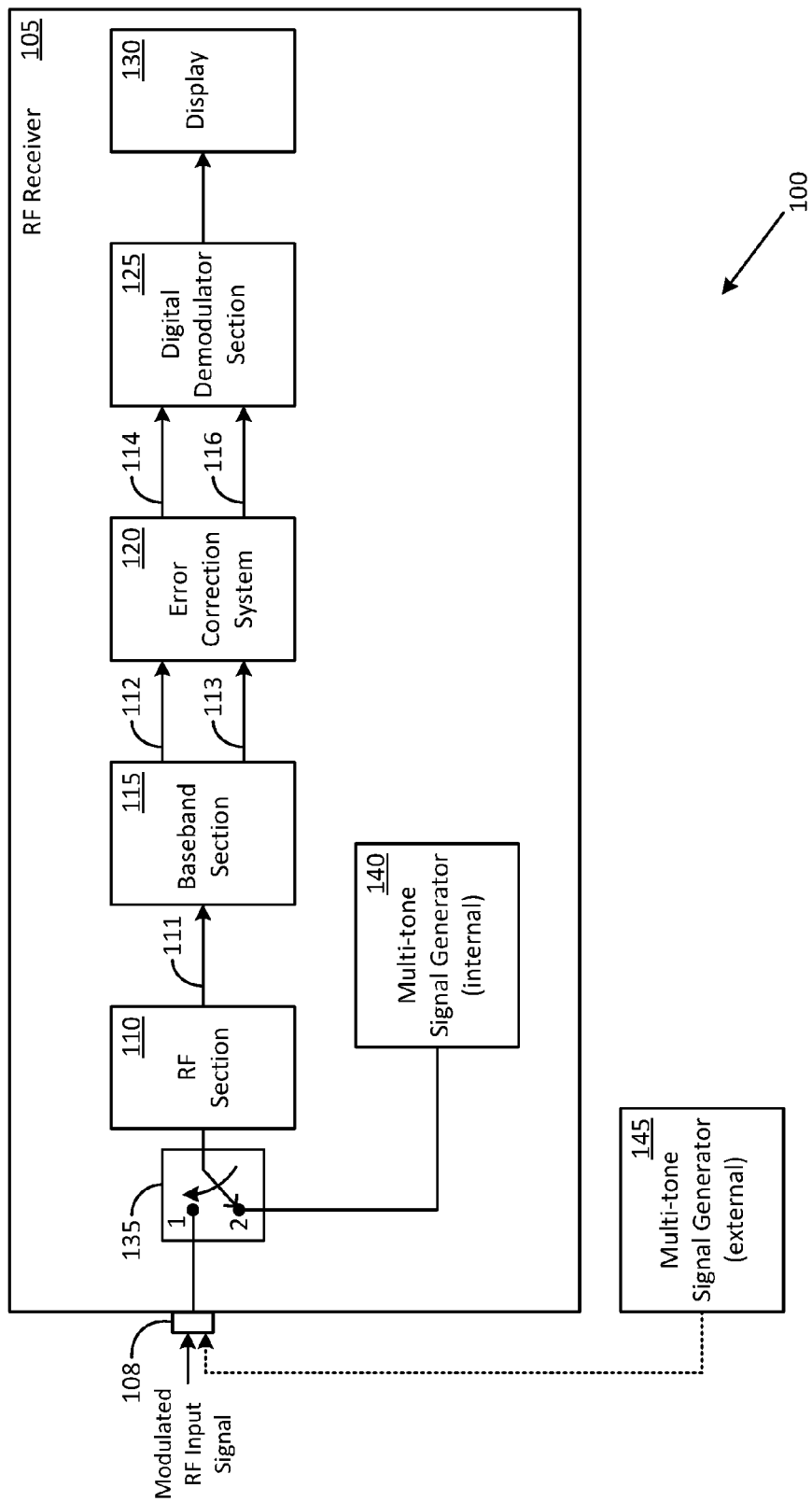
FIG. 1 shows an exemplary radio-frequency (RF) receiver incorporating an error correction system in accordance with the disclosure.

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, the words "test" and "calibration" as used herein in an interchangeable manner generally pertain to measurement procedures directed at identifying various types of errors, flaws, and deviations from desired values. It should also be understood that the word "example" as used herein is intended to be non-exclusionary and non-limiting in nature. More particularly, the word "exemplary" as used herein indicates one among several examples and it should be understood that no special emphasis, exclusivity, or preference, is associated or implied by the use of this word.

Generally, in accordance with the various illustrative embodiments disclosed herein, an RF receiver can include an error correction system that executes a signal processing procedure upon a multi-tone digital I-signal and a multi-tone digital Q-signal to derive a wideband impairment matrix. The wideband impairment matrix can be used to construct a wideband error correction filter for correcting amplitude errors and/or a phase errors in frequency components of an RF input signal provided to the RF receiver. The wideband error correction filter can be also used to correct a gain mismatch and/or a phase mismatch errors between an analog I-signal circuit portion of the RF receiver and an analog Q-signal circuit portion of the RF receiver.

The systems and methods for error detection and error correction that are disclosed herein are particularly beneficial for use in a wide bandwidth RF receiver having an I-Q demodulator operating in a bandwidth that can exceed 1 GHz. The systems and methods can also be used for error detection and error correction in RF transmitters (because RF transmitters typically incorporate circuitry that operate in a complementary manner to circuitry incorporated into RF receivers).

Furthermore, in contrast to some traditional solutions where a step-by-step single-tone sweep technique is used for detecting some types of errors in a sequential manner, the error detection and error correction systems and methods disclosed herein use a wideband error detection approach that can provide for simultaneous detection of amplitude and phase errors in a number of frequency components over a wide bandwidth (exceeding 1 GHz), followed by correcting of these errors in a comprehensive manner. It may be pertinent to point out that the traditional step-by-step single-tone sweep technique is not only time consuming and repetitive (thus more susceptible to measurement errors) but also fails to identify certain types of phase and amplitude errors. For example, the traditional single-tone sweep technique can fail to identify a systems level phase error and/or amplitude error, one or both of which can exist due to various factors, even when the gain and phase characteristics of the I-channel and Q-channel paths through an RF receiver are well matched in terms of both gain and phase.

Attention is now drawn to FIG. 1, which shows an apparatus 100 that includes an exemplary RF receiver 105 incorporating an error correction system 120 in accordance with the disclosure. The RF receiver 105 is configured to operate upon a modulated RF input signal that can be transmitted by an RF transmitter (not shown) and coupled into the RF receiver 105 via an RF input port 108. The modulated RF input signal is received in an RF section 110 that can include various front-end circuits such as a low-noise receiver and an RF amplifier. The modulated RF input signal is coupled from the RF section 110 into a baseband section 115 that can include an I-Q demodulator for generating I channel and Q channel signals from the modulated RF input signal. Additional details pertaining to the baseband section 115 are described below using FIG. 2. The I channel and Q channel signals, which are digital data signals, are propagated via lines 112 and 113 respectively, to the error correction system 120. Each of these digital signals has a frequency bandwidth that is defined by a respective low-pass filter (not shown) located in the baseband section 115. Consequently, even if the modulated RF input signal coupled into the RF input port 108 is a wideband signal having a large number of frequency components, the error correction system 120 is provided with digital I and Q signals having a predetermined bandwidth. The I channel and Q channel signals, which typically have a quadrature phase relationship and are generally referred to herein as baseband signals, can be referred to alternatively, as intermediate frequency (IF) signals in some embodiments.

The error correction system 120 uses a multi-tone calibration signal for purposes of generating a wideband impairment matrix, which is used for generating a wideband error correcting filter. The wideband error correcting filter can be used for correcting amplitude errors and/or phase errors in various frequency components of the modulated RF input signal. These aspects will be described below in more detail.

The I channel and Q channel baseband signals that are propagated out of the error correction system 120 (via lines 114 and 116) are coupled into a digital demodulator section 125, where digital demodulation is carried out to recover the information that was embedded in the modulated RF input signal. In this exemplary embodiment, where the RF receiver 105 is a measurement device such as a spectrum analyzer, the recovered information in the form of a spectral output is viewable on a display 130. In other embodiments, the RF receiver can be a communication device for example and the display 130 can be replaced with a different kind of output interface.

The RF receiver 105 also includes a multi-tone signal generator 140 that can be used to inject a multi-tone calibration signal into the RF section 110 via a switch 135. The switch 135 can be used to prevent the modulated RF input signal from entering the RF section 110 when the multi-tone calibration signal is being injected into the RF section 110. This can be carried out by arranging the switch 135 to provide connectivity via a position 2. Conversely, position 1 of the switch 135 is used to prevent the multi-tone calibration signal from entering the RF section 110 when the modulated RF input signal is routed into the RF section 110.

In some exemplary implementations, an external multi-tone signal generator 145 can be used in lieu of the multi-tone signal generator 140 that is internal to the RF receiver 105. This can be carried out by arranging the switch 135 to provide connectivity for the multi-tone calibration signal, via position 1 into the RF section 110. In this exemplary embodiment, the modulated RF input signal cannot be coupled into the RF receiver 105 at this time.

However, when neither the multi-tone signal generator 140 nor the multi-tone signal generator 145 is being used, switch 135 can be placed in position 1 to allow the modulated RF input signal to enter the RF section 110. In some cases, the modulated RF input signal can contain one or more errors that are introduced by an RF transmitter (not shown) when generating the modulated RF input signal and/or by the RF receiver 105.

In one exemplary method in accordance with the disclosure, switch 135 is configured to first route the multi-tone calibration signal into the error correction system 120 (via the RF section 110 and the baseband section 115) for purposes of detecting errors contributed by the RF section 110 and the baseband section 115. The error correction system 120 is used at this time to generate a wideband impairment matrix based on the detected errors. The switch 135 is then configured to route the modulated RF input signal into the error correction system 120 (via the RF section 110 and the baseband section 115) where errors that are introduced into the modulated RF input signal by the RF section 110 and the baseband section 115 (particularly, the baseband section 115) can be corrected by using a wideband error correction filter that is based on the wideband impairment matrix. These aspects will be described below in more detail.

In one exemplary embodiment in accordance with the disclosure, the multi-tone calibration signal generated by the multi-tone signal generator 140 contains multiple tones in a comb frequency format. Typically, the multi-tone signal generator 140 is a wideband device and the comb frequency generating circuitry that generates a comb frequency signal is quite compact, thereby enabling the multi-tone signal generator 140 to be advantageously incorporated into the RF receiver 105. In one example implementation, the multi-tone signal generator 140 can provide a frequency bandwidth that extends from nearly DC to about 67 GHz. The amplitude and phase response characteristics of the multi-tone signal generator 140 can be calibrated using various references, such as standard signal sources traceable to national standards organizations such as the National Institute of Standards and Technology (NIST). Furthermore, the circuitry incorporated into the multi-tone signal generator 140 can be made relatively insensitive to environmental conditions (temperature, humidity etc.) thereby making it attractive as a calibration reference.

In place of using a comb frequency format as indicated above, in another exemplary embodiment in accordance with the disclosure, the calibration signal generated by the multi-tone signal generator 140 can be a wideband multi-tone signal having multiple tones of known amplitude and phase, but not necessarily related to each other on a harmonics basis (the comb frequency format typically contains a set of harmonic discrete tones). Accordingly, the calibration signal can be a wideband multi-tone signal having non-harmonic frequency components in addition to, or in lieu of, harmonic tones. Such a calibration signal can be used to perform error correction upon a modulated RF input signal that includes two or more non-harmonic frequency components.

In yet another exemplary embodiment in accordance with the disclosure, the multi-tone signal generator 140 can be used to provide a single-tone signal, such as a continuous wave (CW) signal having a known amplitude and phase characteristic. The frequency of the CW signal can be varied in discrete steps over a desired bandwidth that can correspond to a bandwidth provided by the comb-frequency format indicated above.

Figure 2:
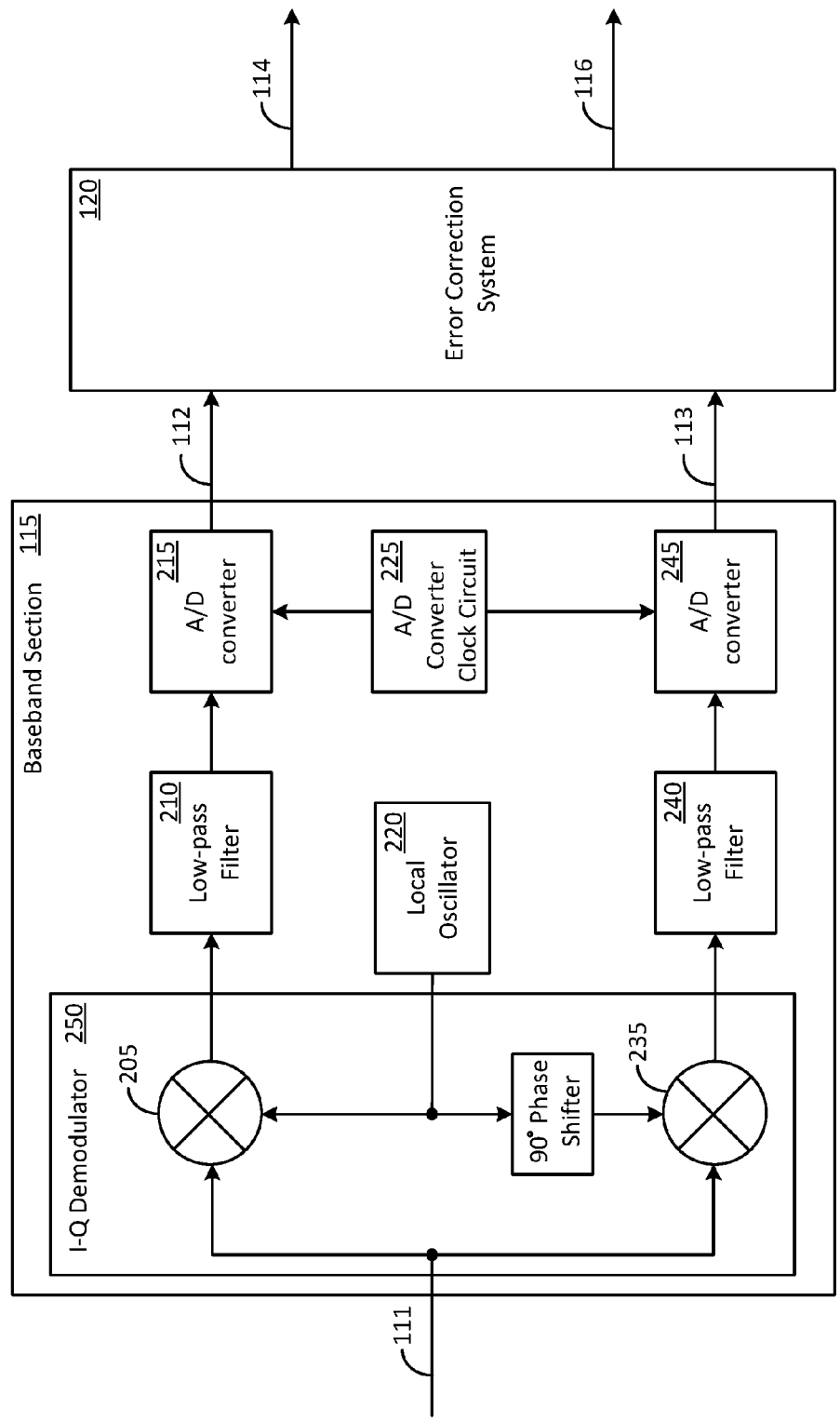
FIG. 2 illustrates a few exemplary elements of a baseband section of the RF receiver shown in FIG. 1.

FIG. 2 illustrates a few exemplary elements of the baseband section 115 of the RF receiver 105. The baseband section 115 uses an I-Q demodulator 250 to produce I channel and Q channel signals from the modulated RF input signal received from the RF section 110 via line 111. I-Q demodulator 250 includes a first mixer 205 that executes a heterodyning operation upon the modulated RF input signal by using a first local oscillator (LO) signal provided by a local oscillator 220. The output of the first mixer 205, which is an analog I-channel signal, is propagated through a low-pass filter 210 having a cut-off frequency that can be selected on the basis of a desired bandwidth of operation of the error correction system 120. In one exemplary implementation, the cut-off frequency is about 1 GHz. (It may be pertinent to point out that the use of the low-pass filter 210 contrasts with the use of a band-pass filter in a traditional intermediate frequency (IF) receiver). The output of the low-pass filter 210 is coupled into an analog-to-digital converter (ADC) 215 that converts the analog I-channel signal into a digital I-channel signal for processing in the error correction system 120. Understandably, the digital I-channel signal has a bandwidth that is defined by the cut-off frequency of the low-pass filter 210.

The I-Q demodulator 250 also includes a second mixer 235 that executes a heterodyning operation upon the modulated RF input signal to produce an analog Q-channel signal. The heterodyning operation is carried out by using a second LO signal that is provided by the local oscillator 220. The second mixer frequency signal has a quadrature phase shift with respect to the first mixer frequency signal. The analog Q-channel signal is propagated through a low-pass filter 240, which can be substantially similar to the low-pass filter 210 in terms of the low-pass frequency characteristic. ADC 245 converts the analog Q-channel signal into a digital Q-channel signal for processing in the error correction system 120. The digital Q-channel signal has a bandwidth that is defined by the cut-off frequency of the low-pass filter 240.

Each of the ADC 215 and the ADC 245 is provided a converter clock by an ADC clock circuit 225, for purposes of carrying out the analog-to-digital conversion. The error correction system 120 receives the digital I-channel signal (via line 112) and the digital Q-channel signal (via line 113) and outputs an error-corrected digital I-channel signal (via line 114) and an error-corrected digital Q-channel signal (via line 116).

Figure 3:
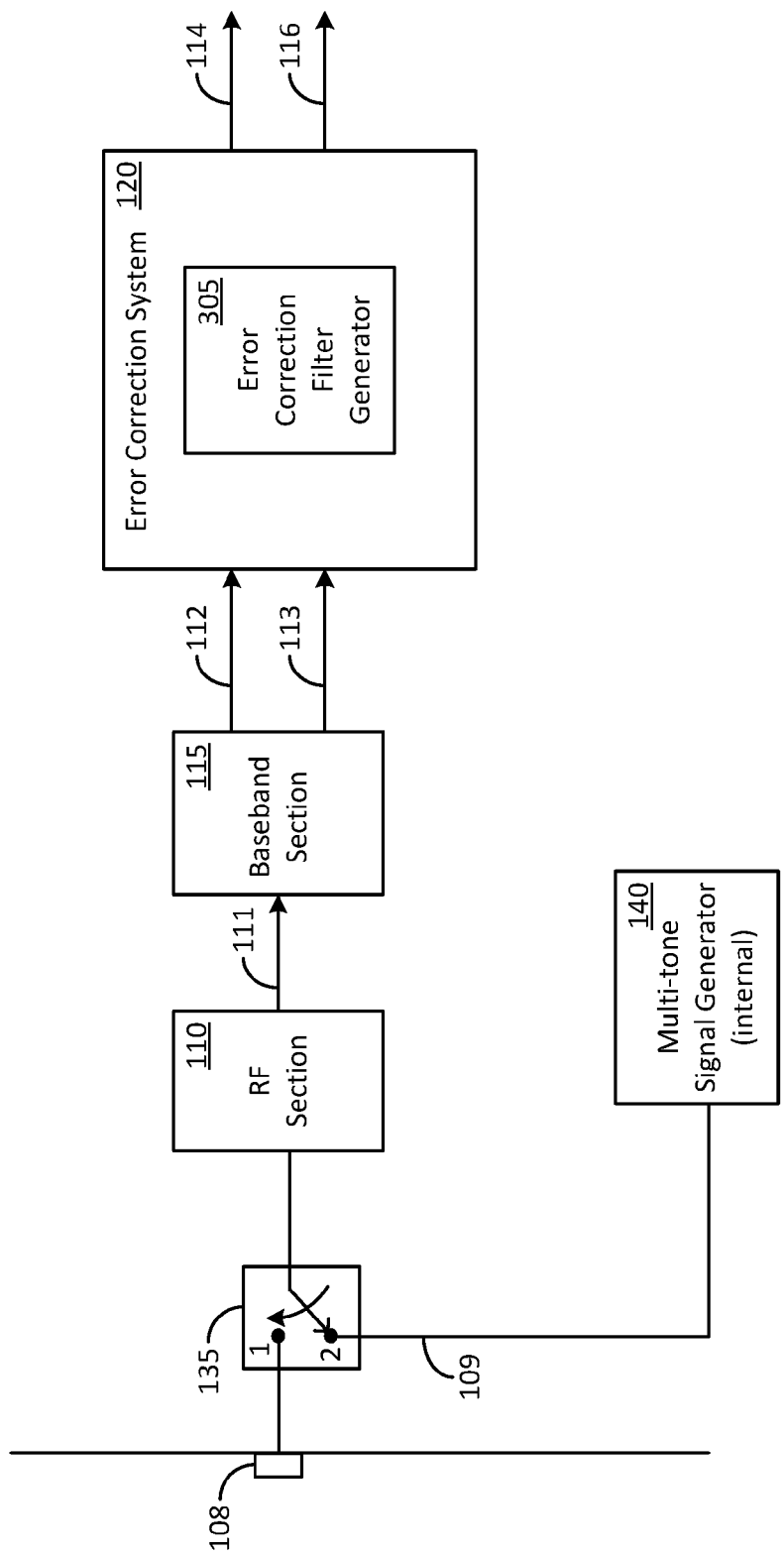
FIG. 3 illustrates an exemplary configuration for generating a wideband error correction filter in accordance with the disclosure.

FIG. 3 illustrates an exemplary configuration for using the error correction system 120 to create a wideband error correction filter generator 305 in accordance with the disclosure. In this exemplary configuration, switch 135 is configured to provide connectivity between the multi-tone signal generator 140 and the RF section 110 via switch position 2. At this time, the RF input port 108 is disconnected from the RF section 110. In an alternative configuration (not shown) the external multi-tone signal generator 145 (shown in FIG. 1) can be used in place of the multi-tone signal generator 140 that is located inside the RF receiver 105.

A wideband multi-tone calibration signal provided by the multi-tone signal generator 140 (or the multi-tone signal generator 145) is routed through the RF section 110 and the baseband section 115. The baseband section 115 converts the wideband multi-tone calibration signal into a multi-tone digital I-channel signal that is provided to the error correction system 120 via line 112 and a multi-tone digital Q-channel signal that is provided to the error correction system 120 via line 113. One or both of the multi-tone digital I-channel signal and the multi-tone digital Q-channel signal can include some errors as a result of differences and shortcomings in the I-channel circuitry and the Q-channel circuitry contained in the baseband section 115. For example, an error can be introduced into the modulated RF input signal by a circuit element in one of the I-channel circuitry or the Q-channel circuitry contained in the baseband section 115. Such errors can include an amplitude error in any one or more frequency components of the wideband multi-tone calibration signal, a phase error in any one or more frequency components of the wideband multi-tone calibration signal, a gain mismatch error between an analog I-signal circuit portion and an analog Q-signal circuit portion, and/or a phase mismatch error between the analog I-signal circuit portion and the analog Q-signal circuit portion. The analog I-signal portion can include the first mixer 205, the low-pass filter 210, and the ADC 215 of the baseband section 115. The analog Q-signal portion can include the second mixer 235, the low-pass filter 240, and the ADC 245 of the baseband section 115.

The error correction system 120 includes a wideband error correction filter generator 305 that executes a signal processing procedure upon the multi-tone digital I-signal and the multi-tone digital Q-signal received via lines 112 and 113 in order to derive a wideband impairment matrix. The wideband impairment matrix is incorporated into a wideband error correction filter that can be used subsequently for correcting errors in the modulated RF input signal. The signal processing procedure for generating the wideband impairment matrix is described below in more detail.

Figure 4:
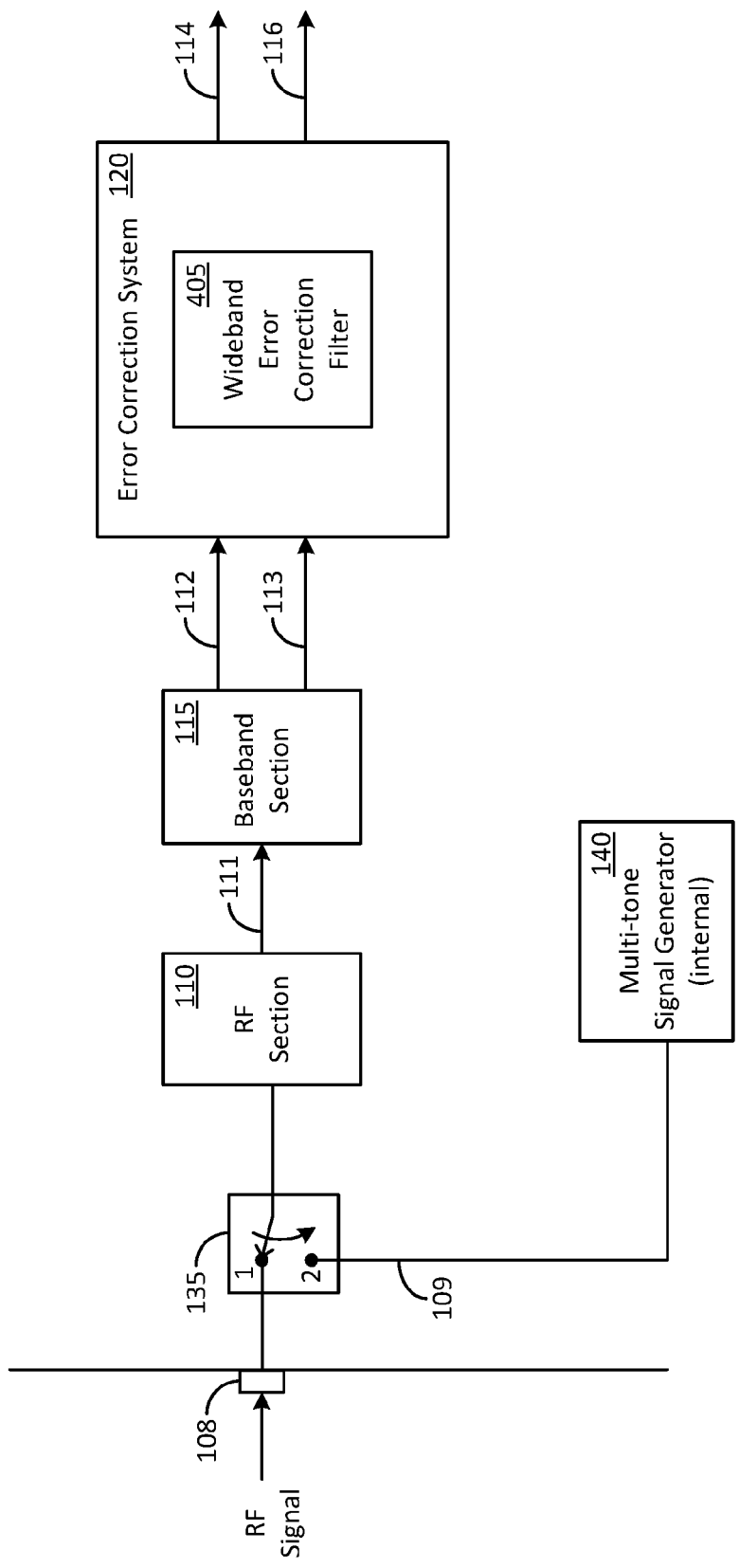
FIG. 4 illustrates an exemplary configuration for using the wideband error correction filter in accordance with the disclosure.

FIG. 4 illustrates an exemplary configuration for using a wideband error correction filter 405 in accordance with the disclosure. The wideband error correction filter 405 is generated by using the wideband error correction filter generator 305 shown in FIG. 3. In this exemplary configuration, switch 135 is configured to route the modulated RF input signal into the RF section 110. The modulated RF input signal is routed to the baseband section 115 via the RF section 110. The baseband section 115 converts the modulated RF input signal into a digital I-channel signal that is provided to the error correction system 120 via line 112 and a digital Q-channel signal that is provided to the error correction system 120 via line 113. One or both of the digital I-channel signal and the digital Q-channel signal can include some errors as a result of differences and shortcomings in the I-channel circuitry and the Q-channel circuitry contained in the baseband section 115. Such errors can include an amplitude error in any one or more frequency components (a CW frequency component for example) of the modulated RF input signal coupled into the RF receiver 105 via the RF input port 108, a phase error in any one or more frequency components (a CW frequency component for example) of the modulated RF input signal, a gain mismatch error between the analog I-signal circuit portion and the analog Q-signal circuit portion, and/or a phase mismatch error between the analog I-signal circuit portion and the analog Q-signal circuit portion. One example of a phase mismatch error pertains to a deviation from a quadrature phase relationship that exists between the I channel and Q channel signals. The quadrature phase relationship can be deemed a reference I-Q phase relationship. The wideband error correction filter 405 corrects one or more of the errors by using the wideband impairment matrix as described below in more detail.

Figure 5:
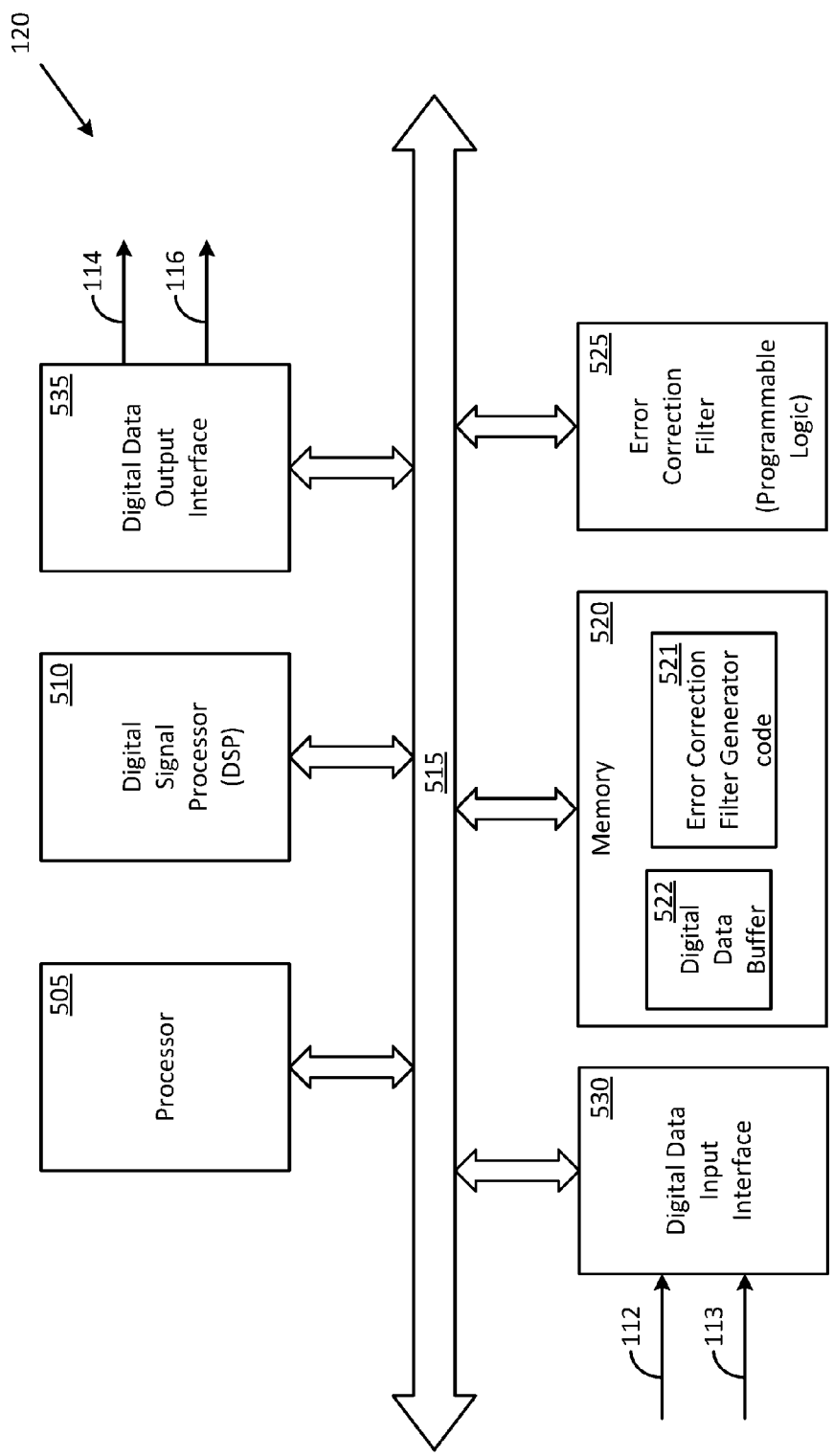
FIG. 5 illustrates some elements of an exemplary error correction system in accordance with the disclosure.

FIG. 5 illustrates some elements of an exemplary error correction system 120 in accordance with the disclosure. The error correction system 120 can include a processor 505, a memory 520, a digital data input interface 530, a digital data output interface 535, a digital signal processor (DSP) 510, and a hardware-based wideband error correction filter 525. The various components of the error correction system 120 can communicatively interact with each other via a communication bus 515. The processor 505 can be implemented and operated using appropriate hardware, software, firmware, or combinations thereof. Software or firmware implementations can include computer-executable or machine-executable instructions written in any suitable programming language to perform the various functions described.

The memory 520 can be used to store program instructions that are loadable and executable by the processor 505, as well as to store data generated during the execution of these programs. Depending on the configuration and type of the error correction system 500, the memory 520 can be volatile (such as random access memory (RAM)) and/or non-volatile (such as read-only memory (ROM), flash memory, etc.). In some embodiments, the memory 520 can also include additional removable storage (not shown) and/or non-removable storage (not shown) including, but not limited to, magnetic disks, optical disks, and/or tape storage.

The memory 520, the removable storage, and the non-removable storage are all examples of non-transitory computer-readable storage media. Such non-transitory computer-readable storage media can be implemented in any method or technology for storage of information such as computer-readable instructions, data structures, program modules or other data. Additional types of non-transitory computer storage media that can be present include, but are not limited to, programmable random access memory (PRAM), SRAM, DRAM, ROM, electrically erasable programmable read-only memory (EEPROM), compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the processor 505. Combinations of any of the above should also be included within the scope of non-transitory computer-readable storage media. Turning to the contents of the memory 520, the memory 520 can include, but is not limited to, an operating system (OS) and one or more application programs or services for implementing the features and aspects disclosed herein. For example, the memory 520 can include a digital data buffer 522 and an error correction filter generator code 521.

In this exemplary implementation, I channel and Q channel signals, which are digital data signals, are propagated from the baseband section 115 into the error correction system 120 via the digital data input interface 530. When the error correction system 120 is used to create the wideband error correction filter generator 305 (as described above with reference to FIG. 3), the I channel and Q channel signals are components of the wideband multi-tone calibration signal and the digital data corresponding to the wideband multi-tone calibration signal is routed to the digital data buffer 522 in the memory 520. The processor 505 and/or the DSP 510 execute the error correction filter generator code 521 in order to access the digital data buffer 522 and use the stored data for evaluating the characteristics (amplitude, phase etc.) of the wideband multi-tone calibration signal for detecting errors introduced by the baseband section 115. Based on the evaluating, the processor 505 and/or the DSP 510 generate a wideband error correction filter in accordance with the disclosure.

In one embodiment, the generated wideband error correction filter is a software-based wideband error correction filter, such as is a finite impulse response (FIR) filter that is executable by the DSP 510.

In another embodiment, the generated wideband error correction filter is implemented in hardware form. When implemented in hardware form, the processor 505 can cooperate with the DSP 510 to use the error correction filter generator code 521 stored in the memory 520 for generating logic device programming code. The logic device programming code, which can also be stored in the memory 520, is used to configure a hardware-based wideband error correction filter 525. The hardware-based wideband error correction filter 525 can be implemented using various types of programmable logic devices such as a field programmable gate array (FPGA), an electrically-programmable logic device (EPLD), or an application specific integrated chip (ASIC). As is known, an FPGA or an EPLD can be configured on power up (via the programming code referred to above) to provide various types of hardware functionalities. The logic device programming code is modifiable by the processor 505, thereby providing versatility in terms of allowing the hardware functionalities to be modified as desired.

When the I channel and Q channel signals are digital data components of the modulated RF input signal and the error correction system 120 is used to correct errors (as described above with reference to FIG. 4), the digital data corresponding to the modulated RF input signal is processed by the processor 505 and/or the DSP 510. During the processing, which is directed at correcting errors introduced into the modulated RF input signal by the baseband section 115, the processor 505 and/or the DSP 510 apply the error correction filter that was generated previously and route the error-corrected digital data out of the error correction system via the digital data output interface 535.

Figure 6:
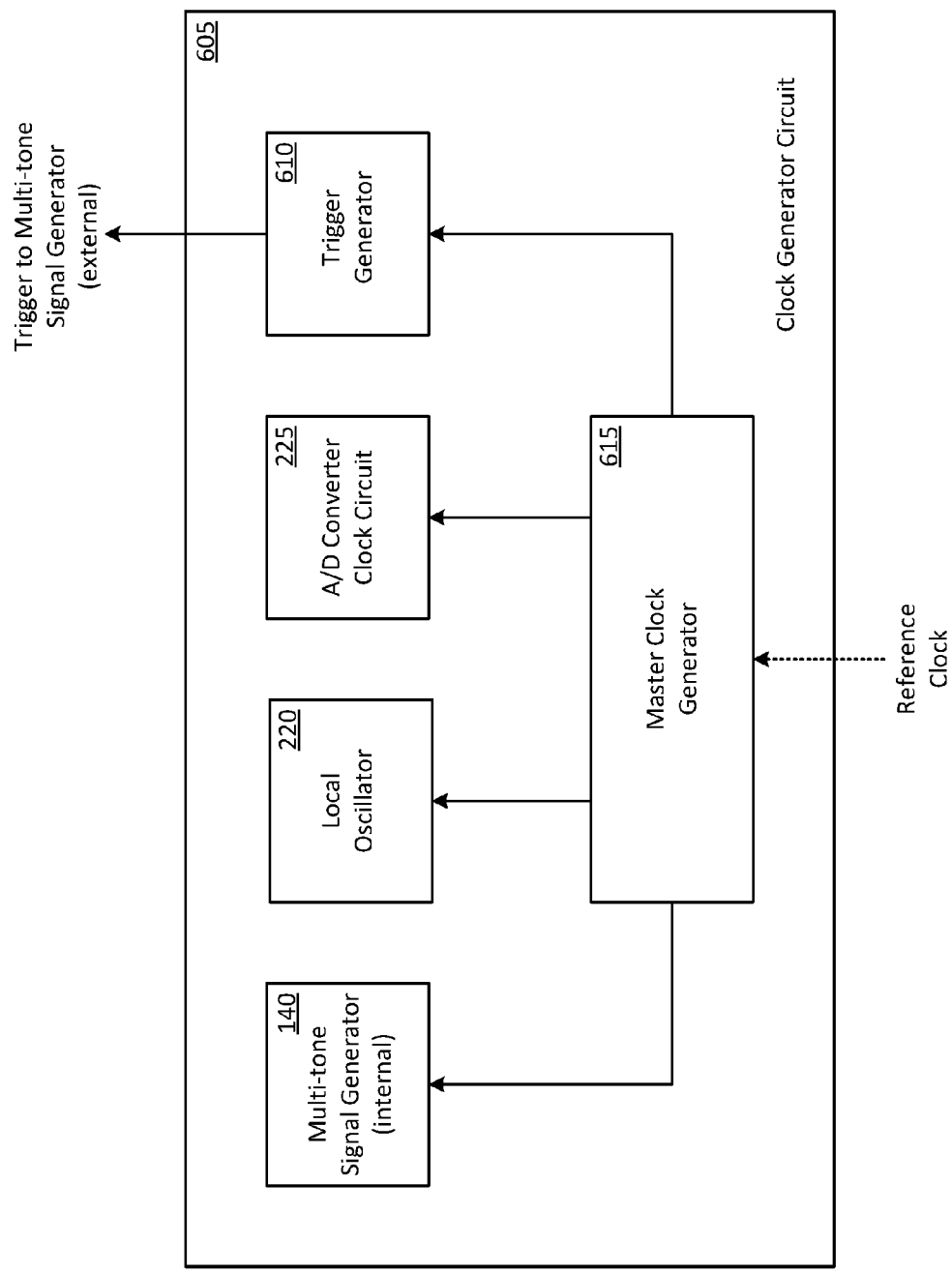
FIG. 6 shows an exemplary clock generator circuit that can be a part of the RF receiver in accordance with the disclosure.

FIG. 6 shows an exemplary clock generator circuit 605 that can be a part of the RF receiver 105 in accordance with the disclosure. The clock generator circuit 605 includes a master clock generator 615 that can be used to provide clocks having various characteristics (frequency, phase, and amplitude) to the multi-tone signal generator 140, the local oscillator 220, the ADC clock circuit 225, and/or a trigger generator 610. A reference clock, such as a standards-based clock, can be optionally coupled into the master clock generator 615 for use by the master clock generator 615 for generating the various output clocks. Using the master clock generator 615 in the clock generator circuit 605 provides for a known frequency relationship in each of the output clock and/or signal provided by the multi-tone signal generator 140, the local oscillator 220, the ADC clock circuit 225, and/or a trigger generator 610. The frequency relationship is particularly beneficial for carrying out an averaging procedure (described below) in the baseband section 115. The trigger generator 610 outputs a trigger signal that can be used by the external multi-tone signal generator 145 so as to provide clock synchronization with the local oscillator 220 and the ADC clock 225 in the baseband section 115.

It may be pertinent to point out that the multi-tone wideband signal generated by the internal multi-tone signal generator 140 (and the external multi-tone signal generator 145) contains a train of very narrow pulses, each having low energy. Consequently, in some exemplary implementations, an averaging procedure can be used to reduce the impact of noise on the various measurements described herein. The clock generator circuit 605 provides for coherent operations when executing the averaging procedure, thus avoiding errors during the multiple actions carried out during the averaging procedure. In order for the averaging to be coherent, the length of the averaged result must be an integer number of periods of the overall repetition rate of a signal. The repetition rate of an analog signal used to create the modulated RF input signal offers the greatest common divisor of the LO frequency and the spacing of the comb tones. The analog signal is sampled into the digital domain at the sample rate, so the overall repetition rate of the digital signal is the greatest common divisor of the analog repetition rate and the digital sample rate.

Figure 7:
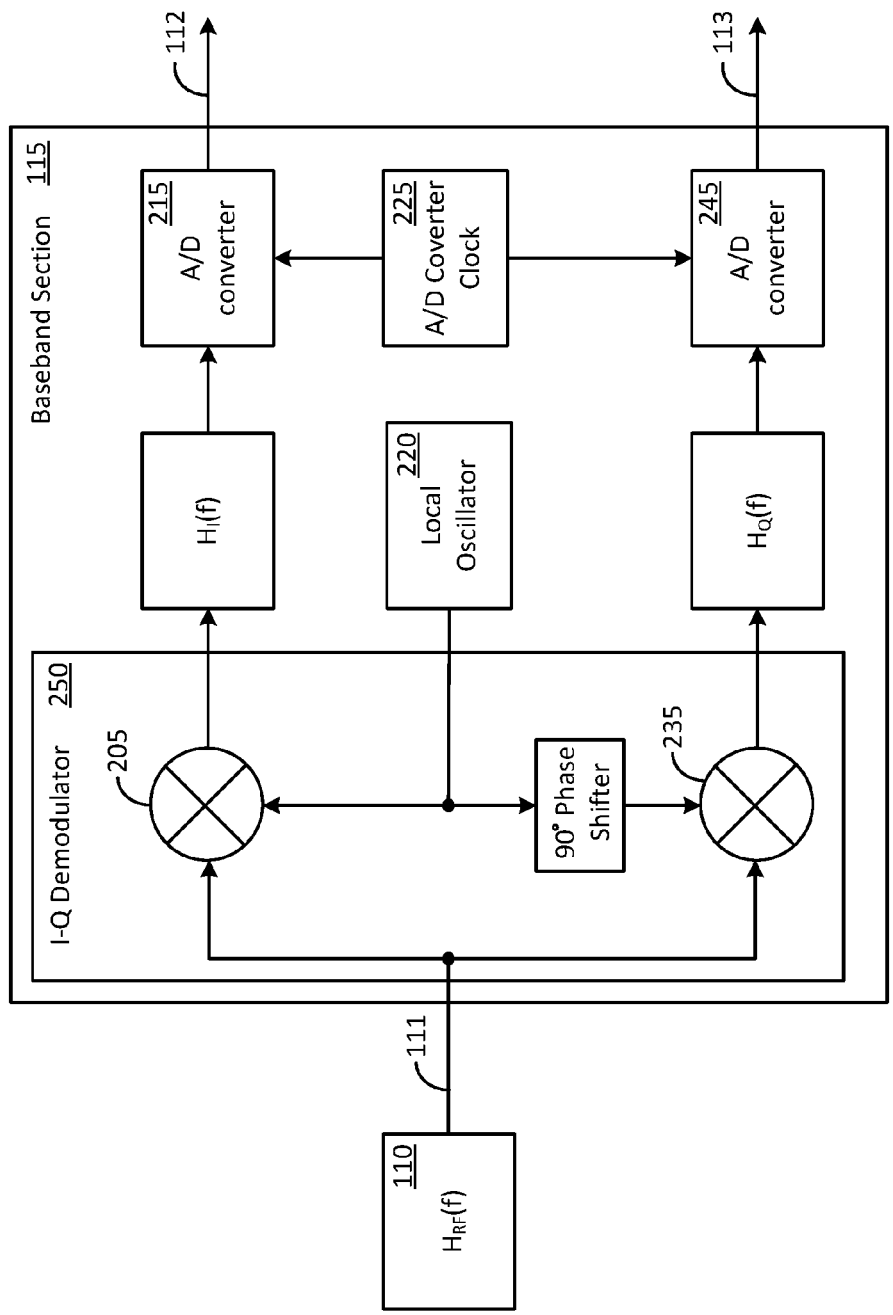
FIG. 7 shows a block diagram indicating transfer functions associated with an RF section and a baseband section of the RF receiver in accordance with the disclosure.

FIG. 7 shows a block diagram indicating some transfer functions associated with the RF section 110 and the baseband section 115. The block diagram shown in FIG. 7 will be used along with some other figures to describe a procedure for determining a wideband error correction matrix in accordance with the disclosure. In general, receivers with analog I-Q demodulators such as the baseband section 115 of the RF receiver 105 have signal error sources because the conversion of an RF input signal into the complex domain at baseband is not perfect. Consequently, an error correction procedure is typically required for rectifying the errors. In one traditionally employed error correction procedure, various I-Q impairments are modeled as a 2×2 matrix by converting ideal I and Q samples into measured I and Q samples. The 2×2 matrix is then inverted to form a 2×2 correction matrix that can be applied to the measured I and Q samples in order to generate a corrected response. However, this traditional approach can only correct impairments that are detected by using a single frequency. The single frequency approach is not only time-consuming and prone to testing errors, but also fails to accurately provide for wide bandwidth corrections (over a 2 GHz bandwidth for example). In contrast, the error correction procedures described herein pertain to using a wideband error correction matrix, which can be derived in a manner that is described below.

Beginning with a single input tone, the ideal I and Q baseband signals can be defined as:

$$I(t) = \cos \omega t$$

$$Q(t) = \sin \omega t$$

Adding orthogonality and gain errors leads to:

$$I' = \cos \omega t$$

$$Q'(t) = \alpha \sin(\omega t + \varphi)$$

These equations can be used to rectify some types of gain errors in a traditional manner. However, in accordance with one embodiment of the disclosure, gain errors as well as phase errors can be corrected by assigning the gain and phase errors to the Q channel in order to simplify generation of a wideband impairment matrix. Specifically, using the angle sum identity, the Q channel can be re-written as follows:

$$Q'(t) = \alpha[\sin(\omega t)\cos(\varphi) + \cos(\omega t)\sin(\varphi)]$$

This allows the following single frequency impairment matrix to be generated:

$$\begin{bmatrix} I'(t) \\ Q'(t) \end{bmatrix} = \begin{bmatrix} 1 & 0 \\ \alpha\sin\varphi & \alpha\cos\varphi \end{bmatrix} \begin{bmatrix} I(t) \\ Q(t) \end{bmatrix}$$

The single frequency impairment matrix can be inverted to generate an error correction matrix that is defined as follows:

$$\begin{bmatrix} I(t) \\ Q(t) \end{bmatrix} = \begin{bmatrix} 1 & 0 \\ \tan\varphi & \alpha^{-1}\sec\varphi \end{bmatrix} \begin{bmatrix} I'(t) \\ Q'(t) \end{bmatrix}$$

This error correction matrix, which can be used for single frequency error applications, can be generalized to address wideband applications, specifically wideband applications that address the baseband section 115 of the RF receiver 105 in accordance with the disclosure.

The generalization aspect is illustrated in FIG. 7, where the RF section 110 is modeled by a transfer function $H_{RF}(f)$, the I-channel circuitry in the I-Q demodulator 250 is modeled by a transfer function $H_I(f)$, and the Q-channel circuitry in the I-Q demodulator 250 is modeled by a transfer function $H_Q(f)$. Errors contained in the transfer function $H_{RF}(f)$ of the RF section 110 can be detected and corrected by an error correction procedure that can be made independent of the procedures disclosed herein that are primarily directed at detecting and correcting errors introduced in the baseband section 115 of the RF receiver 105. Consequently, the block diagram shown in FIG. 7 can be simplified as shown in the block diagram in FIG. 8.

Figure 8:
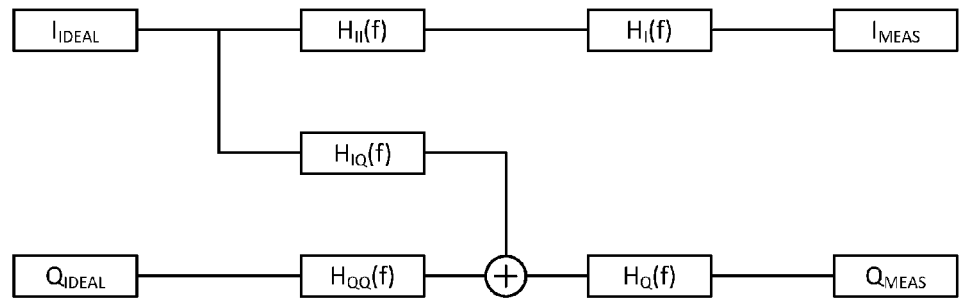
FIG. 8 shows a block diagram indicating idealized I and Q signals converted to measured I and Q signals.

FIG. 8 shows a block diagram indicating idealized I and Q signals converted to measured I and Q signals. This block diagram uses three transfer functions ($H_{II}(f)$, $H_{IQ}(f)$, and $H_{QQ}(f)$) to model the I-Q demodulator 250. Upon comparing these three transfer functions against the wideband impairment matrix above, it can be understood that the transfer function $H_{II}(f)$ can be set to 1, the transfer function $H_{IQ}(f)$ can be set to $\alpha \sin \varphi$, and the transfer function $H_{QQ}(f)$ can be set to $\alpha \cos \varphi$.

Figure 9:
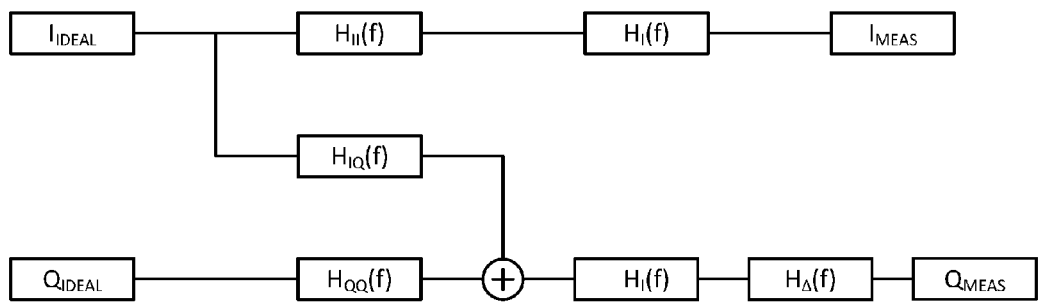
FIG. 9 shows a block diagram where a Q-channel transfer function is defined in terms of an I-channel transfer function and a difference transfer function.

Using only the I-channel as a reference channel further simplifies the analysis and allows for differences in errors between the I-channel circuitry and the Q-channel circuitry to be represented in the manner shown in FIG. 9. FIG. 9 shows a block diagram where the Q-channel transfer function parameters are defined in terms of I-channel transfer function parameters. Specifically, the Q-channel circuitry is defined in terms of an I-channel transfer function ($H_I(f)$) combined with a difference term ($H_\Delta(f)$) indicating a difference between the I-channel and the Q-channel transfer characteristics.

Figure 10:
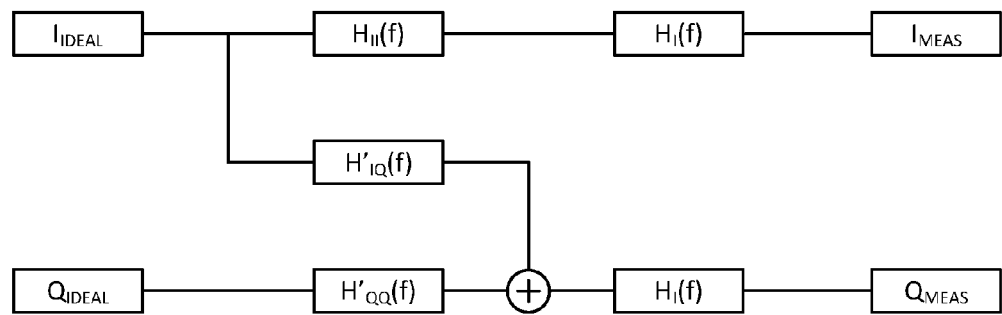
FIG. 10 shows a block diagram indicating a pair of modified transfer functions that incorporate the difference transfer function.

FIG. 10 shows a block diagram indicating the difference term ($H_\Delta(f)$) moved into the $H_{IQ}(f)$ and $H_{QQ}(f)$ transfer functions that are shown in FIG. 9. The modified transfer functions, which are shown as $H'_{IQ}(f)$ and $H'_{QQ}(f)$, now incorporate the transfer function for the I-Q demodulator 250 portion as well as for any difference ($H_\Delta(f)$) that may exist between the I-channel and the Q-channel, thereby leaving the I-channel and the Q-channel characteristics balanced with respect to each other (each indicated by the transfer function $H_I(f)$). As a result of this definition, each of the portion 10 and the portion 15 can be individually evaluated for errors and for rectification of the errors.

Figure 11:
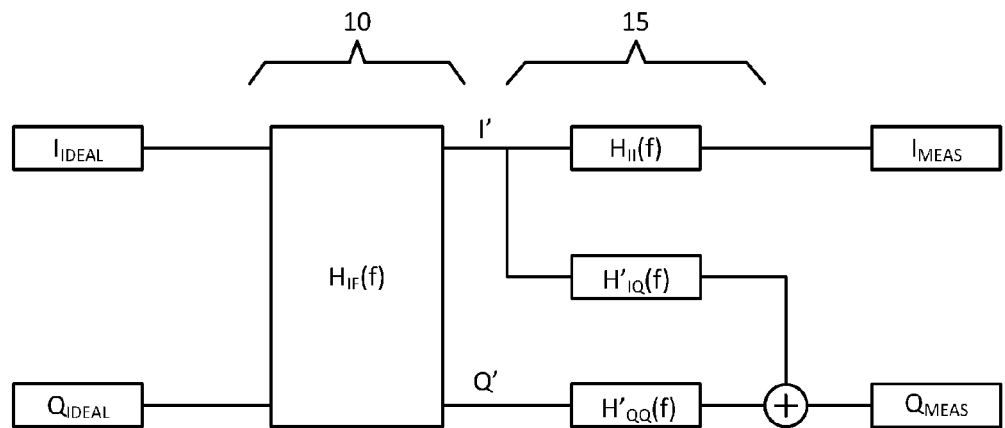
FIG. 11 shows a block diagram wherein the pair of identical I-channel and Q-channel transfer functions are further combined into a unified transfer function.
Figure 12:
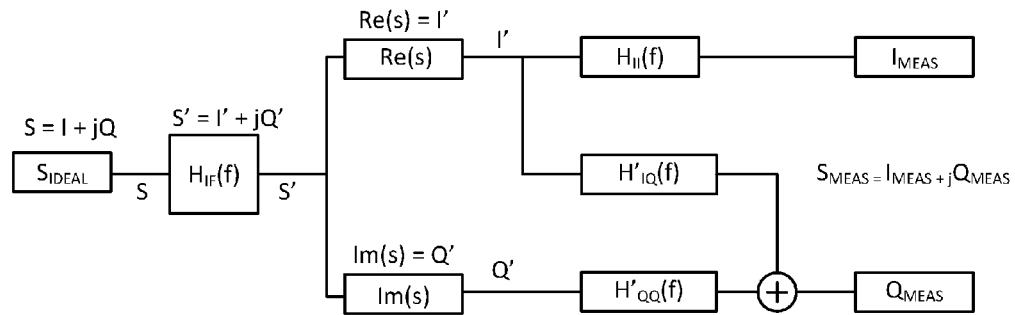
FIG. 12 shows a modified version of the block diagram shown in FIG. 11.

FIG. 11 shows a block diagram where the two matching I and Q transfer functions, $H_I(f)$, are moved into a single complex transfer function ($H_{IF}(f)$) that represents an overall amplitude and phase response of the baseband section 115 of the RF receiver 105. FIG. 12 shows a simplified model of the baseband section 115, wherein an ideal complex signal (S) whose real part is equal to I and an imaginary part equal to Q, is first subjected to a complex transfer function ($H_{IF}(f)$) and split into real and imaginary parts that are then subjected to the $H_{II}(f)$, $H'_{IQ}(f)$, and $H'_{QQ}(f)$ transfer functions. This simplified model separates the overall amplitude and phase errors (modeled by $H_{IF}(f)$) from the amplitude and phase mismatch that can exist between the I and Q channels (modeled by the $H_{II}(f)$, $H'_{IQ}(f)$, and $H'_{QQ}(f)$ transfer functions). The separation allows for the generation of two distinct portions of the error correction filter 405 whereby a first portion can be used to correct any amplitude and phase mismatch that may exist between the I and Q channels of the baseband section 115 and a second portion can be used to correct overall amplitude and phase errors in the baseband section 115. The manner in which these portions are generated are described below in more detail using mathematical transfer functions.

Towards this end, attention is now drawn back to the single frequency impairment matrix referred to above (and reproduced below for convenience):

$$\begin{bmatrix} I'(t) \\ Q'(t) \end{bmatrix} = \begin{bmatrix} 1 & 0 \\ \alpha\sin\varphi & \alpha\cos\varphi \end{bmatrix} \begin{bmatrix} I(t) \\ Q(t) \end{bmatrix}$$

The portion 15 shown in FIG. 11 can be represented as a matrix equation similar to the single frequency impairment matrix shown above:

$$\begin{bmatrix} I_{MEAS}(f) \\ Q_{MEAS}(f) \end{bmatrix} = \begin{bmatrix} H_{II}(f) & 0 \\ H_{QI}(f) & H_{QQ}(f) \end{bmatrix} \begin{bmatrix} I'(f) \\ Q'(f) \end{bmatrix}$$

The three transfer functions can be replaced using the gain and phase mismatch terms as follows:

$$\begin{bmatrix} I_{MEAS}(f) \\ Q_{MEAS}(f) \end{bmatrix} = \begin{bmatrix} 1 & 0 \\ \alpha(f)\sin\varphi(f) & \alpha(f)\cos\varphi(f) \end{bmatrix} \begin{bmatrix} I'(f) \\ Q'(f) \end{bmatrix}$$

which can then be inverted to obtain the following wideband error correction matrix that corrects any amplitude and phase mismatch that may exist between the I and Q channels:

$$\begin{bmatrix} I'(f) \\ Q'(f) \end{bmatrix} = \begin{bmatrix} 1 & 0 \\ \tan\varphi(f) & \alpha^{-1}(f)\sec\varphi(f) \end{bmatrix} \begin{bmatrix} I_{MEAS}(f) \\ Q_{MEAS}(f) \end{bmatrix}$$

The $\alpha$ and $\varphi$ parameters can be found by performing a discrete Fourier transform on the digital I channel and Q channel signals that are provided to the wideband error correction filter generator 305 (shown in FIG. 3) and by comparing the amplitude and phase characteristics of each tone of the wideband multi-tone input signal (calibration signal). This operation can be represented by the following equations:

$$\alpha(f) = \frac{|Q(f)|}{|I(f)|}$$

$$\varphi(f) = \angle Q(f) - \angle I(f) + \pi/2$$

The equations, which are defined at the tone frequencies present in the wideband multi-tone signal, can be interpolated to a desired length of a finite impulse response (FIR) filter. The inverse and trigonometric functions applied to the $\alpha$ and $\varphi$ parameters are sensitive to differences between the I and Q signals. Consequently, the wideband error correction matrix is multiplied with a low-pass filter response characteristic in order to reduce the amplitude of various terms in the wideband error correction matrix, particularly at the band edges where the amplitude of the wideband multi-tone signal can be low as a result of the frequency response of each of the low-pass filter 210 and low-pass filter 240 in the baseband section 115.

The wideband error correction matrix shown above can be incorporated into the error correction filter 405. The error correction filter 405, which can be implemented in the form of a FIR filter containing FIR filter taps, can be used to correct I-channel and Q-channel impairments in the baseband section 115 such as amplitude imbalance, phase imbalance, $\alpha$ and $\varphi$. The error correction filter 405 can be also used to correct an overall amplitude and phase response of the baseband section 115. The filter taps that correct for these errors can be determined separately, then convolved together to form the full error correction filter 405.

The wideband error correction matrix can be separated into the following two normal equations:

$$I'(f) = I_{MEAS}(f)$$

$$Q'(f) = \tan\varphi(f) * I_{MEAS}(f) + \alpha^{-1}(f) * \sec\varphi(f) * Q_{MEAS}(f)$$

Converting to the time domain:

$$I'(t) = I_{MEAS}(t)$$

$$Q'(t) = H^{-1}\{\tan\varphi(f)\}\hat{x}I_{MEAS}(t) + H^{-1}\{\alpha^{-1}(f)*\sec\varphi(f)\}\hat{x}Q_{MEAS}(t)$$

where $H^{-1}$ represents the inverse discrete Fourier transform, and $\hat{x}$ represents the convolution operator.

Expanding the convolution operators, provides the following equations $$I'(t) = I_{MEAS}(t)$$

$$Q'(t) = \sum_{x=-\infty}^{\infty} [C(x) * I_{MEAS}(t-x)] + \sum_{x=-\infty}^{\infty} [D(x) * Q_{MEAS}(t-x)]$$

where $C(t) = H^{-1}(t)\{\tan\varphi\}$ and $D(t) = H^{-1}(t)\{\alpha^{-1}*\sec\varphi\}$. It may be pertinent to point out that the two summation terms in these equations for $Q'(t)$ are equivalent to the definition of an FIR filter, so that $Q'(t)$ is equal to the sum of an FIR filter with taps $C(t)$ applied to $I_{MEAS}$ and an FIR filter with taps $D(t)$ applied to $Q_{MEAS}$.

Converting back to a 2×2 matrix form:

$$\begin{bmatrix} I'(t) \\ Q'(t) \end{bmatrix} = \sum_{x=-\infty}^{\infty} \begin{bmatrix} 1 & 0 \\ C(x) & D(x) \end{bmatrix} * \begin{bmatrix} I_{MEAS}(t-x) \\ Q_{MEAS}(t-x) \end{bmatrix}$$

However, both C and D are complex and it is preferable to have a 2×2 matrix with only real coefficients. Attention is next drawn to FIG. 12, which illustrates an alternative representation of FIG. 11. Even though the I-channel and Q-channel has been indicated above as propagating two distinct time domain signal streams, this pair of time domain signal streams can be represented as a complex signal containing real and imaginary parts as follows:

$$S(t) = I(t) + j*Q(t)$$

Substituting in the above equations:

$$S'(t) =$$

$$I_{MEAS}(t) + j * \left\{ \sum_{x=-\infty}^{\infty} [C(x) * I_{MEAS}(t-x)] + \sum_{x=-\infty}^{\infty} [D(x) * Q_{MEAS}(t-x)] \right\}$$

Separating C and D into real and imaginary parts $$S'(t) = I_{MEAS}(t) + j$$

$$S'(t) = I_{MEAS}(t) + j * \left\{ \sum_{x=-\infty}^{\infty} [(\text{Re}\{C(x)\} + j*\text{Im}\{C(x)\}) * I_{MEAS}(t-x) + \right.$$

-continued
$$\sum_{x=-\infty}^{\infty} [(\text{Re}\{D(x)\} + j*\text{Im}\{D(x)\})*Q_{MEAS}(t-x)]$$

which expands to (where $C_r(x)=\text{Re}\{C(x)\}$, $C_i(x)=\text{Jm}\{C(x)\}$, etc):

$S'(t)=I_{MEAS}(t)+j$ $*\{\Sigma C_r(x)*I_{MEAS}(t-x)+j*\Sigma C_i(x)*I_{MEAS}(t-x)$ $+\Sigma D_r(x)*Q_{MEAS}(t-x)+j*\Sigma D_i(x)*Q_{MEAS}(t-x)\}$ $S'(t)=I_{MEAS}(t)-\Sigma C_i(x)*I_{MEAS}(t-x)$ $-\Sigma D_i(x)*Q_{MEAS}(t-x)+j*\Sigma C_r(x)*I_{MEAS}(t-x)+j$ $*\Sigma D_r(x)*Q_{MEAS}(t-x)$ Using the identity:

$$I_{MEAS}(t) = \sum_{x=-\infty}^{\infty} \delta(x)*I_{MEAS}(t-x), \text{ where } \delta(x) = \begin{cases} 1, x=0 \\ 0, x\neq 0 \end{cases}$$

$S'(t)\Sigma(\delta(x)-C_i(x))*I_{MEAS}(t-x)+\Sigma(-D_i(x))*Q_{MEAS}(t-x)+j$ $*\Sigma C_r(x)*I_{MEAS}(t-x)+j*\Sigma D_r(x)*Q_{MEAS}(t-x)$ Collecting real and imaginary parts, the equations can be separated as follows:

$I'(t)=\Sigma(\delta(x)-C_i(x))*I_{MEAS}(t-x)+\Sigma-D_i(x)*Q_{MEAS}(t-x)$ $Q'(t)=\Sigma C_r(x)*I_{MEAS}(t-x)+\Sigma D_r(x)*Q_{MEAS}(t-x)$ And, finally, converting back to matrix filter form:

$$\begin{bmatrix} I'(t) \\ Q'(t) \end{bmatrix} = \sum_{x=-\infty}^{\infty} \begin{bmatrix} \delta(x)-C_i(x) & -D_i(x) \\ C_r(x) & D_r(x) \end{bmatrix} * \begin{bmatrix} I_{MEAS}(t-x) \\ Q_{MEAS}(t-x) \end{bmatrix}$$

This matrix filter only corrects for the I-channel and Q-channel impairments that generate the $\alpha$ and $\varphi$ error terms (gain imbalance and phase imbalance vs frequency). There are two more error terms, overall gain and phase vs frequency, that are desirable to be corrected in order to generate an accurate estimate of the modulated RF input signal.

The correction for the overall gain and phase can be found after the above result is applied to the multi-tone calibration signal. The wideband error correction filter 405 can be a normal FIR filter with complex taps, applied to a complex input signal:

$$S_{CORR}(t) = \sum_{x=-\infty}^{\infty} F(x)*S'(t)$$

Expanding this into real and imaginary parts:

$$S_{CORR}(t) = \sum_{x=-\infty}^{\infty} (F_r(x)+jF_i(x))*(I'(t-x)+jQ'(t-x))$$

$$S_{CORR}(t) = \sum [F_r(x)*I'(t-x) - F_i(x)*Q'(t-x) + j*F_i(x)*I'(t-x) + j*F_r(x)*Q'(t-x)]$$

In matrix form, this is:

$$\begin{bmatrix} I_{CORR}(t) \\ Q_{CORR}(t) \end{bmatrix} = \sum \begin{bmatrix} F_r(x) & -F_i(x) \\ F_i(x) & F_r(x) \end{bmatrix} * \begin{bmatrix} I'(t-x) \\ Q'(t-x) \end{bmatrix}$$

and can be split into separate equation $I_{CORR}(t)=F_r(t)\hat{x}I'(t)-F_i(t)\hat{x}Q'(t)$ $Q_{CORR}(t)=F_i(t)\hat{x}I'(t)+F_r(t)\hat{x}Q'(t)$ Substituting in equations for I' and Q', and using the x operator for convolution, instead of writing out the summations:

$I_{CORR}(t)=F_r(t)\hat{x}[(\delta(t)-C_i(t))\hat{x}I_{MEAS}(t)-D_i(t)\hat{x}Q_{MEAS}(t)]$ $-F_i(t)\hat{x}[C_r(t)\hat{x}I_{MEAS}(t)+D_r(t)\hat{x}Q_{MEAS}(t)]$ $Q_{CORR}(t)=F_i(t)\hat{x}[(\delta(t)-C_i(t))\hat{x}I_{MEAS}(t)-D_i(t)\hat{x}Q_{MEAS}(t)]$ $+F_r(t)\hat{x}[C_r(t)\hat{x}I_{MEAS}(t)+D_r(t)\hat{x}Q_{MEAS}(t)]$ Using the commutative property of convolution, and collecting terms results in:

$I_{CORR}(t)=[F_r(t)\hat{x}(\delta(t)-C_i(t))-F_i(t)\hat{x}C_r(t)]\hat{x}I_{MEAS}(t)$ $+[-F_r(t)\hat{x}D_i(t)-F_i(t)\hat{x}D_r(t)]\hat{x}Q_{MEAS}(t)$ $Q_{CORR}(t)=[F_i(t)\hat{x}(\delta(t)-C_i(t))+F_r(t)\hat{x}C_r(t)]\hat{x}I_{MEAS}(t)$ $+[-F_i(t)\hat{x}D_i(t)+F_r(t)\hat{x}D_r(t)]\hat{x}Q_{MEAS}(t)$ The two equations above effectively describe a set of four FIR correction filters that can be applied to the measured I and Q signals in order to generate corrected I and Q output signals. The set of four filter taps are the terms that are convolved with the input I and Q signals:

$H_{II}(t)=F_r(t)\hat{x}(\delta(t)-C_i(t))-F_i(t)\hat{x}C_r(t)$ $H_{IQ}(t)=-F_r(t)\hat{x}D_i(t)-F_i(t)\hat{x}D_r(t)$ $H_{QI}(t)=F_i(t)\hat{x}(\delta(t)-C_i(t))+F_r(t)\hat{x}C_r(t)$ $H_{QQ}(t)=-F_i(t)\hat{x}D_i(t)+F_r(t)\hat{x}D_r(t)$ where:

$I_{CORR}(t)=H_{II}(t)\hat{x}I_{MEAS}(t)+H_{IQ}(t)\hat{x}Q_{MEAS}(t)$ $Q_{CORR}(t)=H_{QI}(t)\hat{x}I_{MEAS}(t)+H_{QQ}(t)\hat{x}Q_{MEAS}(t)$ This is more compactly represented as a 2×2 matrix filter, which provides the following wideband error correction matrix in accordance with the disclosure:

$$\begin{bmatrix} I_{CORR}(t) \\ Q_{CORR}(t) \end{bmatrix} = \sum_{x=-\infty}^{\infty} \begin{bmatrix} H_{II}(x) & H_{IQ}(x) \\ H_{QI}(x) & H_{QQ}(x) \end{bmatrix} \begin{bmatrix} I_{MEAS}(t-x) \\ Q_{MEAS}(t-x) \end{bmatrix} =$$

$$\sum \begin{bmatrix} F_r(x)\otimes(\delta(x)-C_i(x))-F_i(x)\otimes C_r(x) & -F_r(x)\otimes D_i(x)-F_i(x)\otimes D_r(x) \\ F_i(x)\otimes(\delta(x)-C_i(x))+F_r(x)\otimes C_r(x) & -F_i(x)\otimes D_i(x)+F_r(x)\otimes D_r(x) \end{bmatrix}$$

$$\begin{bmatrix} I_{MEAS}(t-x) \\ Q_{MEAS}(t-x) \end{bmatrix}$$

The wideband error correction matrix is an equation representing the wideband error correction filter 405 that can be used to correct for the impairments encountered by the modulated RF input signal (as described above with reference to FIG. 4) when propagating through the baseband section 115. Additional impairments that can be encountered by the modulated RF input signal in the RF section 110 of the RF receiver 105 can be rectified by combining the wideband correction filter with additional correction terms as described below.

Figure 13:
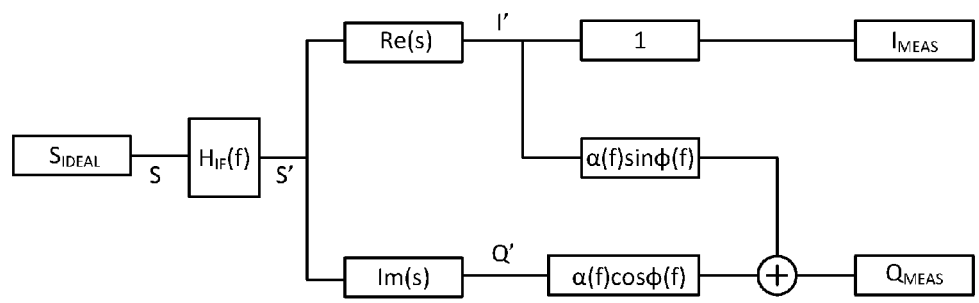
FIG. 13 shows an error model of the baseband section of the RF receiver in accordance with the disclosure.
Figure 14:
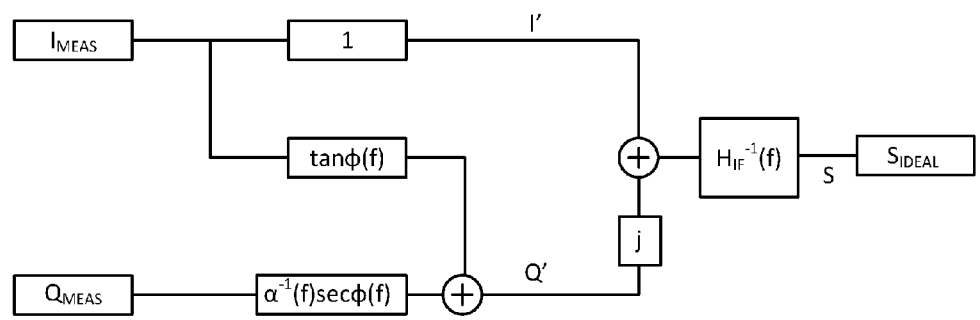
FIG. 14 shows a correction model that inverts measured errors determined by using the simplified model shown in FIG. 13.

FIG. 13 shows a simplified error model of the baseband section 115 and FIG. 14 shows a correction model that inverts measured errors determined by using the simplified error model shown in FIG. 13. More particularly, the correction model inverts measured errors shown in FIG. 13 in order to determine an approximation of an ideal modulated RF input signal that is unaffected by errors introduced in the baseband section 115 of the RF receiver 105. This correction model is equivalent to the wideband correction matrix derived above.

Figure 15:
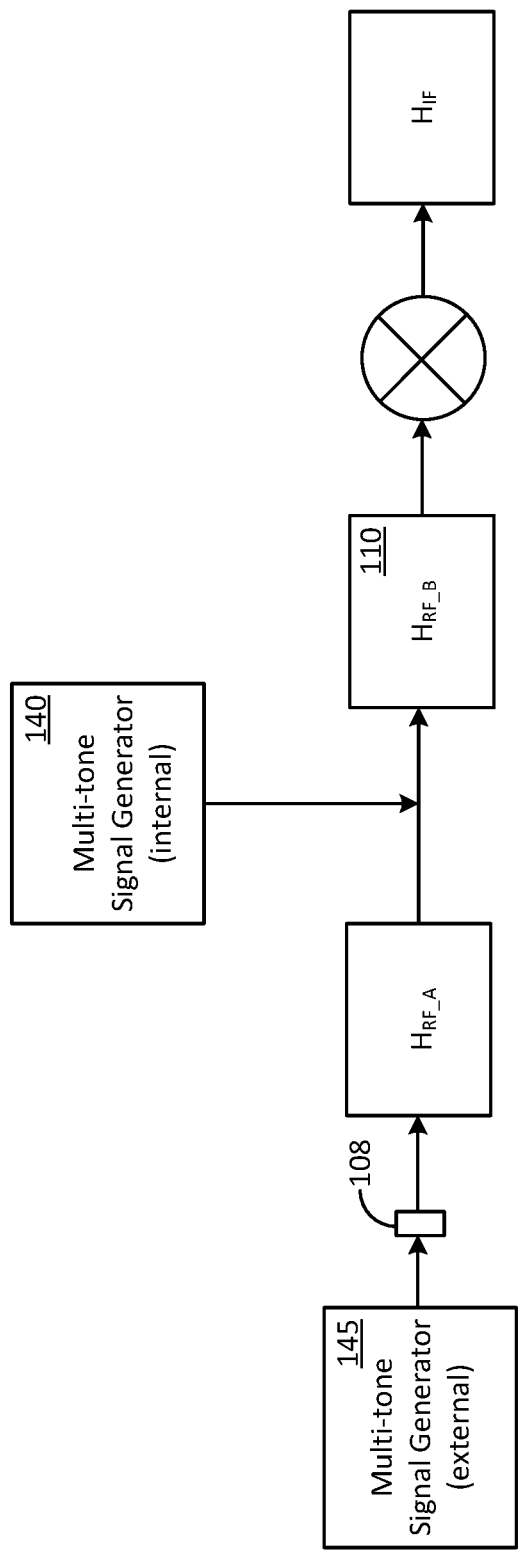
FIG. 15 shows a block diagram indicating transfer functions associated with some RF sections when executing an error correction procedure in accordance with the disclosure.

FIG. 15 shows a block diagram indicating transfer functions associated with some RF sections that can be provided in the RF receiver 105 to accommodate connecting of the external multi-tone signal generator 145. As can be seen the signal path for the external multi-tone signal generator 145 includes a first amplifier section indicated by a first transfer function $H_{RF\_A}$ that is not present in the signal path for the internal multi-tone signal generator 140. In some exemplary embodiments, the difference in the signal paths can be taken into consideration when executing an error correction procedure in accordance with the disclosure. The first RF transfer function $H_{RF\_A}$ comes into play only when the external multi-tone signal generator 145 is used to provide the multi-tone wideband signal for calibrating the RF receiver 105. $H_{RF\_B}$ is a second RF transfer function that comes into play when the internal multi-tone signal generator 140 is used to provide the multi-tone wideband signal for calibrating the RF receiver 105. $H_{RF\_A}$ is not in play at this time.

The contribution of each of these two RF transfer functions has to be taken into account as the two can cause different impairments. Consequently, an initialization procedure can be executed, particularly when the external multi-tone signal generator 145 is used, to determine a contribution of the first RF transfer function ($H_{RF\_A}$) and/or the second RF transfer function ($H_{RF\_B}$) and remove these contributions when determining the impairments contributed by the baseband section 115. Mathematically, the removal operation can be mathematically described as follows:

$$IF_{effective} = IF_{meas}/H_{RF}(f-f_{LO})$$

$$H_{corrFilt\_IF} = (IF_{effective})^{-1}$$

It may be pertinent to point out that the correction filter terms in these equations only affect the overall amplitude and phase correction part of the wideband error correction filter and not the amplitude and phase imbalance portion of the wideband error correction filter.

When generating the wideband error correction filter the inverse portion is added back in order to correct for the wideband response:

$$H_{CorrFilt_{Overall}} = H_{CorrFilt_{IF}} * H_{RF}(f-f_{LO})^{-1}$$

where $H_{RF}(f-f_{LO})$ is the RF response shifted by the LO frequency (so that the center frequency is at DC).

In order to simplify the generation of the IF response data, the internal comb generator calibration data can be pre-corrected to remove the contribution of the RF path. This automatically generates the $IF_{effective}$ term without any extra steps in the wideband correction filter generation procedure.

In summary, it should be noted that the invention has been described with reference to a few illustrative embodiments for the purpose of demonstrating the principles and concepts of the invention. It will be understood by persons of skill in the art, in view of the description provided herein, that the invention is not limited to these illustrative embodiments. Persons of skill in the art will understand that many such variations can be made to the illustrative embodiments without deviating from the scope of the invention.

What is claimed is:

1. An apparatus, comprising:
a radio-frequency (RF) receiver, including:
an I-Q demodulator configured to receive a multi-tone calibration signal in a comb frequency format and convert the multi-tone calibration signal into a multi-tone analog I-signal and a multi-tone analog Q-signal;
at least one analog-to-digital converter configured to convert the multi-tone analog I-signal and the multi-tone analog Q-signal to a multi-tone digital I-signal and a multi-tone digital Q-signal respectively; and
an error correction system comprising a processor configured to:
execute a signal processing procedure upon the multi-tone digital I-signal and the multi-tone digital Q-signal to derive a wideband impairment matrix; and
generate from the wideband impairment matrix, a wideband error correction filter operative to correct at least one error in an RF input signal provided to the RF receiver.

2. The apparatus of claim 1, wherein the at least one error in the RF input signal comprises at least one of an amplitude error in any one or more frequency components of the RF input signal, a phase error in any one or more frequency components of the RF input signal, a gain mismatch error between an analog I-signal circuit portion of the RF receiver and an analog Q-signal circuit portion of the RF receiver, or a phase mismatch error between the analog I-signal circuit portion of the RF receiver and the analog Q-signal circuit portion of the RF receiver.

3. The apparatus of claim 2, wherein at least one of the amplitude error, the phase error, the gain mismatch error, or the phase mismatch error is introduced into the RF input signal by the I-Q demodulator.

4. The apparatus of claim 1, wherein the wideband impairment matrix comprises a 2×2 matrix and the wideband error correction filter generated from the 2×2 matrix is operative in a time domain.

5. The apparatus of claim 1, further comprising a multi-tone signal generator configured to provide to the I-Q demodulator, the multi-tone calibration signal in the comb frequency format.

6. The apparatus of claim 1, wherein the I-Q demodulator comprises I-channel circuitry modeled by a first transfer function and Q-channel circuitry modeled by a second transfer function.

7. The apparatus of claim 1, wherein the RF input signal includes two or more non-harmonic frequency components and wherein the wideband error correction filter is used to correct at least one of an amplitude error or a phase error in at least one of the two or more non-harmonic frequency components.

8. A method comprising:
receiving a multi-tone calibration signal in a radio-frequency (RF) receiver;
converting the multi-tone calibration signal into a multi-tone analog I-signal and a multi-tone analog Q-signal;
converting the multi-tone analog I-signal and the multi-tone analog Q-signal to a multi-tone digital I-signal and a multi-tone digital Q-signal respectively;
deriving a wideband impairment matrix by executing a signal processing procedure upon the multi-tone digital I-signal and the multi-tone digital Q-signal;
generating from the wideband impairment matrix, a wideband error correction filter;
receiving in the RF receiver, an RF input signal comprising a continuous wave (CW) frequency component; and
applying the wideband error correction filter to correct at least one error in the RF input signal.

9. The method of claim 8, wherein the at least one error in the RF input signal comprises at least one of an amplitude error in any one or more frequency components of the RF input signal, a phase error in any one or more frequency components of the RF input signal, a gain mismatch error between an analog I-signal circuit portion of the RF receiver and an analog Q-signal circuit portion of the RF receiver, or a phase mismatch error between the analog I-signal circuit portion of the RF receiver and the analog Q-signal circuit portion of the RF receiver.

10. The method of claim 9, wherein at least one of the amplitude error, the phase error, the gain mismatch error, or the phase mismatch error is introduced into the RF input signal by a circuit element in one of the analog I-signal circuit portion of the RF receiver or the analog Q-signal circuit portion of the RF receiver.

11. The method of claim 9, wherein at least one of the amplitude error, the phase error, the gain mismatch error, or the phase mismatch error is introduced into the RF input signal by at least one of an I-Q demodulator or at least one analog-to-digital converter.

12. The method of claim 9, wherein the phase mismatch error is indicative of a deviation from a reference I-Q phase relationship.

13. The method of claim 8, wherein the wideband error correction filter is used to correct at least one of an amplitude error or a phase error in the CW frequency component.

14. An error correction system comprising a processor configured to:
derive a wideband impairment matrix by executing a signal processing procedure upon a multi-tone digital I-signal and a multi-tone digital Q-signal provided to the error correction system by a radio-frequency (RF) receiver;
generate from the wideband impairment matrix, a wideband error correction filter; and
apply the wideband error correction filter to correct at least one error in an RF input signal provided to the RF receiver, the RF input signal comprising a continuous wave (CW) frequency component.

15. The error correction system of claim 14, wherein the at least one error in the RF input signal comprises at least one of an amplitude error in any one or more frequency components of the RF input signal, a phase error in any one or more frequency components of the RF input signal, a gain mismatch error between an analog I-signal circuit portion of the RF receiver and an analog Q-signal circuit portion of the RF receiver, or a phase mismatch error between the analog I-signal circuit portion of the RF receiver and the analog Q-signal circuit portion of the RF receiver.

16. The error correction system of claim 15, wherein the multi-tone digital I-signal and the multi-tone digital Q-signal are generated in the RF receiver by demodulating a comb frequency signal provided to the RF receiver.

17. The error correction system of claim 16, wherein the RF input signal is provided to the RF receiver subsequent to providing the comb frequency signal, and wherein at least one of the amplitude error, the phase error, the gain mismatch error, or the phase mismatch error is introduced into the RF input signal by the RF receiver when demodulating the RF input signal into an analog I-signal and an analog Q-signal.

18. The error correction system of claim 14, wherein the CW frequency component is one of two or more non-harmonic frequency components and wherein the wideband error correction filter is applied to correct at least one of an amplitude error or a phase error in at least one of the two or more non-harmonic frequency components.

19. The error correction system of claim 14, wherein the wideband error correction filter is applied to correct at least one of an amplitude error or a phase error in the CW frequency component.

20. The error correction system of claim 15, wherein the phase mismatch error is indicative of a deviation from a reference I-Q phase relationship.

* * * * *